United States Patent
Sugawara et al.

(10) Patent No.: US 10,793,677 B2
(45) Date of Patent: Oct. 6, 2020

(54) POLYMER AND RESIN COMPOSITION CONTAINING THE SAME

(71) Applicant: NISSAN CHEMICAL INDUSTRIES, LTD., Tokyo (JP)

(72) Inventors: Yuki Sugawara, Funabashi (JP); Takahiro Sakaguchi, Funabashi (JP); Isao Adachi, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 138 days.

(21) Appl. No.: 15/771,280

(22) PCT Filed: Oct. 4, 2016

(86) PCT No.: PCT/JP2016/079507
§ 371 (c)(1),
(2) Date: Apr. 26, 2018

(87) PCT Pub. No.: WO2017/073268
PCT Pub. Date: May 4, 2017

(65) Prior Publication Data
US 2019/0055359 A1   Feb. 21, 2019

(30) Foreign Application Priority Data

Oct. 27, 2015 (JP) .................... 2015-211168

(51) Int. Cl.
| | |
|---|---|
| C08G 75/04 | (2016.01) |
| C08G 75/12 | (2016.01) |
| G02B 3/00 | (2006.01) |
| C08G 59/66 | (2006.01) |
| C09D 181/02 | (2006.01) |
| C08J 3/24 | (2006.01) |
| C08J 5/18 | (2006.01) |
| G02B 1/04 | (2006.01) |

(52) U.S. Cl.
CPC ............ *C08G 75/04* (2013.01); *C08G 59/66* (2013.01); *C08G 75/12* (2013.01); *C08J 3/24* (2013.01); *C08J 5/18* (2013.01); *C09D 181/02* (2013.01); *G02B 1/041* (2013.01); *G02B 3/00* (2013.01); *C08J 2381/02* (2013.01)

(58) Field of Classification Search
CPC ........ C08G 75/04; C08G 59/66; C08G 75/12; C08J 3/24; C08J 5/18; C08J 2381/02; C09D 181/02; G02B 1/041; G02B 3/00
See application file for complete search history.

(56) References Cited

U.S. PATENT DOCUMENTS

| | | | | |
|---|---|---|---|---|
| 6,320,020 B1 * | 11/2001 | Takuma | ................. | C08G 59/38 525/115 |
| 2006/0052547 A1 * | 3/2006 | Jethmalani | ............ | C08F 212/34 525/333.3 |
| 2009/0093570 A1 | 4/2009 | Hsu et al. | | |

FOREIGN PATENT DOCUMENTS

| | | |
|---|---|---|
| CN | 1250060 A | 4/2000 |
| JP | S64-010666 A | 1/1989 |
| JP | H06-112459 A | 4/1994 |
| JP | 2000-351846 A | 12/2000 |
| JP | 2001-091702 A | 4/2001 |
| JP | 2003-086353 A | 3/2003 |
| JP | 2005-003991 A | 1/2005 |
| JP | 2007-211021 A | 8/2007 |
| JP | 2007-270099 A | 10/2007 |
| JP | 2009-062459 A | 3/2009 |
| JP | 2009-084310 A | 4/2009 |
| JP | 2009-227936 A | 10/2009 |
| JP | 2011-016887 A | 1/2011 |
| JP | 2011-162765 A | 8/2011 |
| JP | 2011-184331 A | 9/2011 |
| JP | 2011-190413 A | 9/2011 |
| JP | 2012-188379 A | 10/2012 |
| JP | 5716878 B1 | 5/2015 |
| WO | 2012/032868 A1 | 3/2012 |

OTHER PUBLICATIONS

Dec. 27, 2016 Search Report issued in International Patent Application No. PCT/JP2016/079507.
Dec. 27, 2016 Written Opinion of International Searching Authority issued in International Patent Application No. PCT/JP2016/079507.
Mar. 20, 2020 Office Action issued in Chinese Patent Application No. 201680057605.1.
May 8, 2020 Office Action issued in Taiwanese Patent Application No. 105133724.

* cited by examiner

*Primary Examiner* — Robert S Walters, Jr.
(74) *Attorney, Agent, or Firm* — Oliff PLC

(57) ABSTRACT

A resin composition capable of forming a cured film having a high refractive index, high transparency and high heat resistance, and a polymer which is used for the resin composition. A polymer having a structural unit of Formula (1):

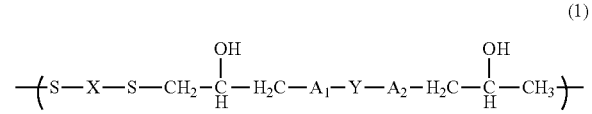

(1)

wherein $A_1$ and $A_2$ are each independently an —O— group or a —C(=O)O— group; X is a divalent organic group having at least one aromatic ring or heterocyclic ring, wherein, when the X has two or more aromatic rings or heterocyclic rings, the rings are optionally bonded to each other via a single bond, are optionally bonded to each other via a heteroatom, or optionally form a condensed ring; and Y is a divalent organic group having at least one aromatic ring or condensed ring. A resin composition, includes: the polymer; a cross-linking agent; and a solvent.

7 Claims, No Drawings

POLYMER AND RESIN COMPOSITION CONTAINING THE SAME

TECHNICAL FIELD

The present invention relates to a polymer having a specific structural unit and a resin composition containing the polymer, and specifically relates to a resin composition capable of forming a cured film having high transparency and a high refractive index.

BACKGROUND ART

In recent years, plastic materials have been extensively employed in optical articles and have been studied for the applications to, for example, eyeglass lenses, Fresnel lenses, lenticular lenses, aspheric lenses, optical discs, optical fibers, and optical waveguides. Furthermore, in the field of electronic materials, transparent resins have been heavily employed as optical electronic materials such as an anti-reflective coating agent for liquid crystal displays, a transparent coating agent for solar batteries, a light emitting diode, and a light receiver of a CCD or CMOS image sensor. The application to such optical electronic materials often requires not only transparency, but also requires a high refractive index in order to improve light extraction efficiency and light harvesting properties. Generally, as methods for imparting a higher refractive index to a plastic material, the introduction of an aromatic ring, the introduction of a halogen atom other than fluorine, the introduction of a sulfur atom, the introduction of a metal atom, and the introduction of a hydrogen bond have been employed.

Examples of the resin widely used for plastic materials include a resin obtained by radical polymerization of diethylene glycol bis(allyl carbonate). A composition described in Patent Document 1 and including the above-mentioned resin as an essential component has excellent storage stability, allows a conventional cast molding method for plastics to be made use of as it is, and hardly causing a damage to a mold when cured. A plastic lens obtained by curing the composition has various features such as the lower degree of uneven dyeing compared to conventional plastic lenses.

However, the plastic lens obtained by curing the resin composition has a low refractive index of approximately 1.50, and accordingly the lens has a larger center thickness or a larger edge thickness. Therefore, a resin for lenses with a higher refractive index has been desired.

In order to increase the refractive index of a polymer itself, the introduction of a substituent having a high molar refraction, a low molar volume, or a high specific gravity in accordance with the Lorentz-Lorenz formula is effective. Hence, the introduction of a halogen atom, a sulfur atom, or a metal atom each having a high molar refraction and a high specific gravity is effective for increasing the refractive index of a polymer.

As Patent Document 2 and Patent Document 3 describe a sulfur atom-containing compounds for optical resins, a sulfur atom has been heavily used to increase refractive index, because of its high polarizability, and high stability and its ease of introduction to a polymer.

It has been known that a nano-composite including high-refractive-index inorganic oxide particles and an organic polymer matrix easily achieves a refractive index of more than 1.80. However, a fine particle dispersion resin such as a composition described in Patent Document 4 has a problem in long term storage stability, and furthermore, has a problem such that the resin requires a large amount of a dispersion stabilizer to improve the dispersion stability of the inorganic oxide fine particles in the resin. Therefore, it is difficult to balance the refractive index and the dispersion stability when such a fine particle dispersion resin is used.

One of known methods for producing a microlens for CCD/CMOS image sensors is an etch back method (Patent Document 5 and Patent Document 6). In the method, a resist pattern is formed on a resin layer for microlenses that is formed on a color filter layer, and this resist pattern is heat-treated to cause reflow, thus forming a lens pattern. Using, as an etching mask, the lens pattern formed by allowing this resist pattern to reflow, the resin layer for microlenses as an underlayer is etched back to transfer the lens pattern shape to the resin layer for microlenses, thus yielding a microlens.

In the etch back method, for the accurate transfer of a lens pattern shape to a resin layer for microlenses as an underlayer, it is required that the dry etching rate X of the resist and the dry etching rate Y of the resin layer for microlenses would be substantially equal (X:Y=1:0.8 to 1:1.2).

PRIOR ART DOCUMENTS

Patent Document

Patent Document 1: Japanese Patent Application Publication No. 2001-91702 (JP 2001-91702 A)
Patent Document 2: Japanese Patent Application Publication No. 2007-211021 (JP 2007-211021 A)
Patent Document 3: Japanese Patent Application Publication No. 2012-188379 (JP 2012-188379 A)
Patent Document 4: Japanese Patent Application Publication No. 2007-270099 (JP 2007-270099 A)
Patent Document 5: Japanese Patent Application Publication No. 1-10666 (JP 1-10666 A)
Patent Document 6: Japanese Patent Application Publication No. 6-112459 (JP 6-112459 A)

SUMMARY OF THE INVENTION

Problem to be Solved by the Invention

An object of the present invention is to provide a resin composition that solves the above-mentioned conventional problems, satisfies the performance required for resins for microlenses, and is capable of forming a cured film having a high refractive index, excellent transparency and heat resistance, and a dry etching rate equivalent to that of photoresist, and to provide a polymer for use in the resin composition. Another object of the present invention is to provide a microlens having a high refractive index and excellent transparency and heat resistance.

Means for Solving the Problem

The inventors of the present invention have conducted intensive study to solve the above-mentioned problems, and, as a result, they have completed the present invention. Specifically, the present invention provides a polymer having a structural unit of Formula (1):

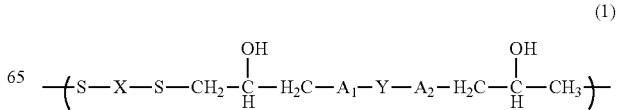

(1)

(wherein $A_1$ and $A_2$ are each independently an —O— group or a —C(=O)O— group; X is a divalent organic group having at least one aromatic ring or heterocyclic ring, wherein, when the X has two or more aromatic rings or heterocyclic rings, the rings are optionally bonded to each other via a single bond, are optionally bonded to each other via a heteroatom, or optionally form a condensed ring; and Y is a divalent organic group having at least one aromatic ring or condensed ring.)

The present invention provides a resin composition comprising the above-mentioned polymer, a cross-linking agent, and a solvent.

The resin composition according to the present invention is, for example, a resin composition for microlenses.

The present invention provides a method for forming a cured film, the method comprising: applying the above-mentioned resin composition onto a substrate; and subsequently baking the resin composition by using a heating means.

Effects of the Invention

The resin composition according to the present invention is capable of forming a cured film having a high refractive index, high transparency, and high heat resistance, and having a dry etching rate equivalent to that of resist. Accordingly, the resin composition according to the present invention allows the provision of a microlens having a high refractive index, excellent transparency, and excellent heat resistance.

MODES FOR CARRYING OUT THE INVENTION

The present invention provides a polymer having a structural unit of Formula (1) and a resin composition comprising the polymer, a cross-linking agent, and a solvent. The refractive index of a cured film of the resin composition, the cured film being obtained by heating at 230° C. or higher after film formation, is preferably 1.68 or higher, more preferably 1.70 or higher. The transmittance of the cured film at a wavelength of 400 nm is 90% or more. The solid content, excluding the solvent, of the resin composition according to the present invention is typically 0.01% by mass to 70% by mass. Hereinafter, the components of the resin composition will be described in detail.

Monomers to form the polymer according to the present invention, that is, raw material monomers of the polymer are a dimercapto compound of Formula (2) and a diglycidyl compound of Formula (3):

(2)

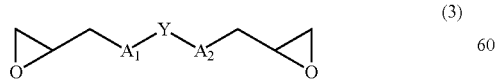

(3)

(wherein $A_1$, $A_2$, X, and Y are defined as same as the definition in Formula (1)).

Examples of the divalent organic group of X include groups of Formula (a) to Formula (e):

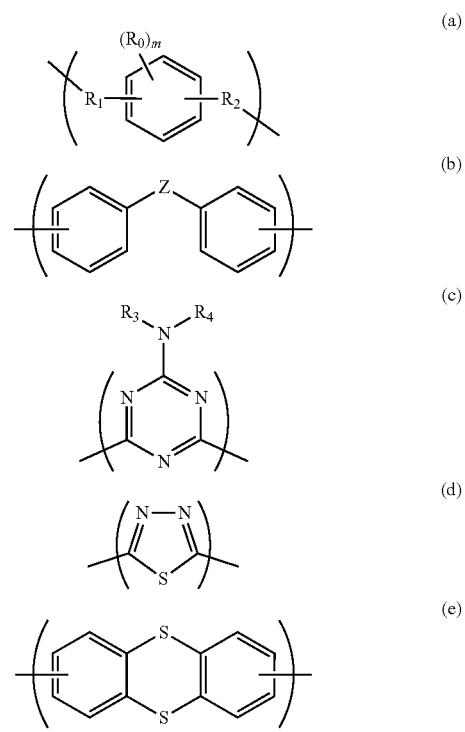

(wherein $R_0$ is a methyl group; m is an integer of 0 to 2; $R_1$ and $R_2$ are each independently a single bond or a methylene group; Z is a single bond or a —S— group; $R_3$ is a hydrogen atom, a $C_{1-10}$ alkyl group optionally having a branched structure, an aryl group, a $C_2$ or $C_3$ alkenyl group, or a $C_2$ or $C_3$ alkynyl group; and $R_4$ is a $C_{1-10}$ alkyl group optionally having a branched structure, an aryl group, a $C_2$ or $C_3$ alkenyl group, or a $C_2$ or $C_3$ alkynyl group).

Examples of the divalent organic group of Y include groups of Formula (f) and Formula (g).

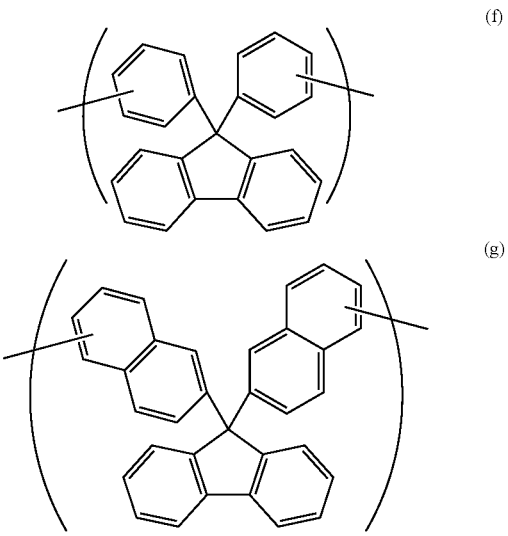

<Dimercapto Compound>

Examples of the dimercapto compound of Formula (2) include 1,4-benzene dithiol, 1,3-benzene dithiol, 4,5-bis (mercaptomethyl)-o-xylene, bismuthiol, 6-anilino-1,3,5-triazine-2,4-dithiol, 6-(diallylamino)-1,3,5-triazine-2,4-dithiol, 4,4'-biphenyldithiol, 1,5-dimercaptonaphthalene, 4,4'-thiobisbenzenethiol, and 2,7-dimercaptothianthrene.

<Diglycidyl Compound>

Examples of the diglycidyl compound of Formula (3) include bisglycidyl terephthalate, resorcinol diglycidyl ether, 2,2-bis(4-glycidyloxyphenyl)propane, bisphenol fluorene diglycidyl ether, bisnaphthol fluorene diglycidyl ether, monoallyl diglycidyl isocyanurate, and bis[4-(2,3-epoxypropylthio)phenyl]sulfide.

The polymer typically has a weight-average molecular weight of 1,000 to 300,000, preferably 3,000 to 150,000. It should be noted that the weight-average molecular weight is a value obtained by gel permeation chromatography (GPC) using polystyrene as a standard sample.

The polymer content of the resin composition according to the present invention is typically 1% by mass to 99% by mass, preferably 5% by mass to 95% by mass, with respect to the solid content of the resin composition.

In the present invention, a method for obtaining the above-mentioned polymer is not limited to a particular one, but typically the polymer is obtained by a polymerization reaction of a compound (monomer) of Formula (2) and a compound (monomer) of Formula (3) in a solvent under the presence of a catalyst, as necessary, typically at a temperature of 23° C. to 200° C. The compound of Formula (2) and the compound of Formula (3) are used in a molar ratio of from 1:9 to 9:1, preferably from 3:5 to 5:3. The thus-obtained polymer is typically in a solution state in which the polymer is dissolved in a solvent. The polymer in such state can be used for the resin composition according to the present invention, without isolation.

The thus-obtained copolymer solution is poured into a stirred poor solvent, such as hexane, diethyl ether, methanol, or water, to reprecipitate the copolymer. The resultant precipitate is filtrated and washed, and subsequently, under atmospheric pressure or reduced pressure, dried at room temperature or dried by heating to make the copolymer into a powder. This operation allows the removal of a polymerization initiator and an unreacted compound that are present together with the copolymer. In the present invention, the powder of the copolymer may be used as it is, or alternatively the powder of the copolymer may be, for example, redissolved in a later-mentioned solvent and used in a solution state.

Examples of a method for preparing the resin composition according to the present invention include, but not particularly limited to, a method of dissolving a polymer having a structural unit of Formula (1) in a solvent to prepare a uniform solution. Furthermore, at a suitable stage in this preparation method, for example, a curing agent and other additives may be added and mixed, as necessary.

The solvent is not limited to a particular one as long as the solvent is capable of dissolving the polymer having a structural unit of Formula (1).

Examples of such solvent include ethylene glycol monomethyl ether, ethylene glycol monoethyl ether, methyl cellosolve acetate, ethyl cellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, propylene glycol monoethyl ether, propylene glycol monobutyl ether, propylene glycol monobutyl ether acetate, toluene, xylene, methyl ethyl ketone, cyclopentanone, cyclohexanone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropionate, ethyl 3-methoxypropionate, ethyl 3-ethoxypropionate, methyl 3-ethoxypropionate, methyl pyruvate, ethyl acetate, butyl acetate, ethyl lactate, butyl lactate, dimethyl acetamide, 2-heptanone, N-methyl-2-pyrrolidone, and γ-butyrolactone. These solvents may be used alone, or two or more thereof may be used in combination.

Among the above-mentioned solvents, propylene glycol monomethyl ether, propylene glycol monomethyl ether acetate, propylene glycol monoethyl ether, cyclopentanone, cyclohexanone, ethyl lactate, dimethylacetamide, N-methyl-2-pyrrolidone, and γ-butyrolactone are preferable from the viewpoint of improvement in the leveling properties of a coating formed by applying the resin composition according to the present invention onto a substrate.

The resin composition according to the present invention may include a surfactant in order to improve the coating properties.

Examples of the surfactant include: nonionic surfactants, such as polyoxyethylene alkyl ethers such as polyoxyethylene lauryl ether, polyoxyethylene stearyl ether, polyoxyethylene cetyl ether, and polyoxyethylene oleyl ether, polyoxyethylene alkylaryl ethers such as polyoxyethylene octylphenyl ether and polyoxyethylene nonylphenyl ether, polyoxyethylene-polyoxypropylene block copolymers, sorbitan fatty acid esters such as sorbitan monolaurate, sorbitan monopalmitate, sorbitan monostearate, sorbitan monooleate, sorbitan trioleate, and sorbitan tristearate, polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate, and polyoxyethylene sorbitan tristearate; fluorine-based surfactants, such as EFTOP (registered trademark) EF301, EF303, and EF352 (manufactured by Mitsubishi Materials Electronic Chemicals Co., Ltd.), MEGAFACE (registered trademark) F171, F173, R-30, R-40, and R-40-LM (manufactured by DIC Corporation), Fluorad FC430 and FC431 (manufactured by Sumitomo 3M Ltd.), AsahiGuard (registered trademark) AG710, Surflon (registered trademark) S-382, SC101, SC102, SC103, SC104, SC105, and SC106 (manufactured by Asahi Glass Co., Ltd.), and Ftergent-series such as DFX-18, FTX-206D, FTX-212D, FTX-218, FTX-220D, FTX-230D, FTX-240D, FTX-212P, FTX-220P, FTX-228P, and FTX-240G (manufactured by NEOS Co., Ltd.); and organosiloxane polymer KP341 (manufactured by Shin-Etsu Chemical Co., Ltd.). These surfactants may be used alone, or two or more thereof may be used in combination.

In the case where the above-mentioned surfactant is used, the surfactant content of the resin composition according to the present invention is typically 3% by mass or less, preferably 1% by mass or less, more preferably 0.5% by mass or less with respect to the solid content of the resin composition.

The resin composition according to the present invention may include additives such as a cross-linking agent, a catalyst for promoting a cross-linking reaction, an ultraviolet absorber, a sensitizer, a plasticizer, an antioxidant, and an adhesive aid, as necessary, as long as such an additive does not interfere with the effect of the present invention.

Examples of the cross-linking agent to be added to the resin composition according to the present invention include a polyfunctional (meth)acrylate compound, a hydroxymethyl group-substituted phenol compound, a compound having an alkoxyalkylated amino group, and a polyfunctional blocked isocyanate compound. These cross-linking agents may be used alone, or two or more thereof may be used in combination. Although the content of a cross-linking agent varies depending on an application solvent to be used, a base substrate to be used, a required solution viscosity, and a required film shape, the cross-linking agent content may be 0.001% by mass to 80% by mass, preferably 0.01% by mass to 50% by mass, more preferably 0.05% by mass to 40% by mass with respect to the total solid content of the resin composition according to the present invention. These cross-linking agents sometimes cause a cross-linking reaction due to self-condensation, but, in the case where a cross-linkable substituent is present in the above-mentioned high molecular compounds according to the present invention, the cross-linking agents can cause a cross-linking reaction with the cross-linkable substituent. In the present specification, (meth)acrylate refers to methacrylate and acrylate.

Examples of the polyfunctional (meth)acrylate compound include ethylene glycol di(meth)acrylate, diethylene glycol di(meth)acrylate, triethylene glycol di(meth)acrylate, polyethylene glycol di(meth)acrylate, tetraethylene glycol di(meth)acrylate, propylene glycol di(meth)acrylate, dipropylene glycol di(meth)acrylate, tripropylene glycol di(meth)acrylate, polypropylene glycol di(meth)acrylate, 1,4-butanediol di(meth)acrylate, neopentyl glycol di(meth)acrylate, 1,6-hexanediol di(meth)acrylate, tricyclodecanedimethanol di(meth)acrylate, dicyclopentanyl di(meth)acrylate, bisphenol A di(meth)acrylate, ethoxylated bisphenol A di(meth)acrylate, propoxylated bisphenol A di(meth)acrylate, bisphenol S di(meth)acrylate, phthalic acid di(meth)acrylate, 9,9-bis[4-(2-(meth)acryloyloxyethoxy)phenyl]fluorene, glycerol di(meth)acrylate, glycerol tri(meth)acrylate, glycerol ethoxy tri(meth)acrylate, glycerol propoxy tri(meth)acrylate, trimethylolpropane tri(meth)acrylate, trimethylolpropane ethoxy tri(meth)acrylate, trimethylolpropane propoxy tri(meth)acrylate, ditrimethylolpropane tetra(meth)acrylate, pentaerythritol tri(meth)acrylate, pentaerythritol tetra(meth)acrylate, pentaerythritol ethoxy tetra(meth)acrylate, dipentaerythritol penta(meth)acrylate, dipentaerythritol hexa(meth)acrylate, sorbitol hexa(meth)acrylate, tris(2-(meth)acryloyloxyethyl)isocyanurate, and ε-caprolactone-modified tris-(2-(meth)acryloyloxyethyl)isocyanurate.

Examples of the polyfunctional (meth)acrylate compound also include polyfunctional urethane (meth)acrylates synthesized by reacting (meth)acrylate or polyfunctional (meth) acrylate having a hydroxy group, such as 2-hydroxyethyl (meth)acrylate, 4-hydroxybutyl (meth)acrylate, glycerol di(meth)acrylate, pentaerythritol tri(meth)acrylate, or dipentaerythritol penta(meth)acrylate, with a diisocyanate compound, such as 2,4-tolylene diisocyanate, 2,6-tolylene diisocyanate, 1,3-xylene diisocyanate, 1,4-xylene diisocyanate, xylylene diisocyanate, 1,5-naphthalene diisocyanate, m-phenylene diisocyanate, p-phenylene diisocyanate, diphenylmethane diisocyanate, 4,4'-diphenylmethane diisocyanate, 4,4'-dibenzyl diisocyanate, isophorone diisocyanate, 1,6-hexamethylene diisocyanate, dicyclohexylmethane diisocyanate, 2,2,4-trimethylhexamethylene diisocyanate, 2,4,4-trimethylhexamethylene diisocyanate, 1,3-bis(isocyanatomethyl)benzene, or 1,3-bis(isocyanatomethyl)cyclohexane.

Examples of the polyfunctional (meth)acrylate compound also include polyfunctional epoxy (meth)acrylates synthesized by reacting (meth)acrylic acid with a homopolymer or copolymer obtained by radical polymerization of a (meth) acrylate monomer having an epoxy group, such as glycidyl (meth)acrylate, glycidyloxybutyl (meth)acrylate, or 3,4-epoxycyclohexylmethyl (meth)acrylate. The copolymer herein refers to a polymer obtained by polymerizing two or more kinds of monomers. The copolymer may be a copolymer obtained by polymerizing two or more (meth)acrylates each having an epoxy group, or may be a copolymer obtained by polymerizing a (meth)acrylate having an epoxy group and another (meth)acrylate.

Examples of commercially available products of the polyfunctional (meth)acrylate compound include the following products.

ARONIX [registered trademark] M-208, M-210, M-211B, M-215, M-220, M-225, M-233, M-240, M-245, M-260, M-270, M-303, M-305, M-306, M-309, M-310, M-313, M-315, M-321, M-350, M-360, M-400, M-402, M-403, M-404, M-405, M-406, M-408, M-450, M-452, M-460, M-510, M-520, M-1100, M-1200, M-1210, M-1310, M-1600, M-1960, M-6100, M-6200, M-6250, M-6500, M-7100, M-7300K, M-8030, M-8060, M-8100, M-8530, M-8560, and M-9050 (manufactured by TOAGOSEI CO., LTD.).

KAYARAD [registered trademark] NPGDA, PEG400DA, FM-400, R-167, HX-220, HX-620, R-526, R-551, R-712, R-604, R-684, GPO-303, TMPTA, HDDA, TPGDA, KS-HDDA, KS-TPGDA, MANDA, THE-330, TPA-320, TPA-330, PET-30, T-1420, T-1420(T), RP-1040, DPHA, DPEA-12, D-310, D-330, DPCA-20, DPCA-30, DPCA-60, DPCA-120, FM-700, DN-0075, DN-2475, TC-120S, R-115, R-130, R-381, EAM-2160, CCR-1291H, CCR-1235, ZAR-1035, ZAR-2000, ZFR-1401H, ZFA-1491H, ZCR-1569H, ZCR-1601H, ZCR-1797H, ZCR-1798H, UXE-3000, UXE-3024, UX-3204, UX-4101, UXT-6100, UX-6101, UX-7101, UX-8101, UX-0937, UXF-4001-M35, UXF-4002, DPHA-40H, UX-5000, UX-5102D-M20, UX-5103D, and UX-5005 (manufactured by Nippon Kayaku Co., Ltd.).

NK Ester A-200, A-400, A-600, A-1000, A-1500, A-2000, ABE-300, A-BPE-4, A-BPE-6, A-BPE-10, A-BPE-20, A-BPE-30, A-BPEF, A-BPP-3, A-DCP, A-DOD-N, A-HD-N, A-NOD, A-GLY-3E, A-GLY-9E, A-GLY-20E, A-TMPT, A-TMPT-3EO, A-TMPT-9EO, ATM-4E, ATM-35E, APG-100, APG-200, APG-400, APG-700, A-PTMG-65, A-1000PER, A-B1206PE, 701A, A-9300, A-9300-1CL, A-9300-6CL, A-9530, ADP-51EH, ATM-31EH, A-TMM-3, A-TMM-3L, A-TMM-3LM-N, AD-TMP, A-TMMT, A-9550, A-DPH, A-DPH-12E, 1G, 2G, 3G, 4G, 9G, 14G 23G BPE-80N, BPE-100, BPE-100N, BPE-200, BPE-500, BPE-900, BPE-1300N, DCP, DOD-N, HD-N, NOD-N, NPG 1206PE, 701, 3PG, 9PG, and TMPT; NK Economer A-PG5009E, A-PG5027E, and A-PG5054E; and NK Oligo U-2PPA, U-6LPA, U-10HA, U-10PA, UA-1100H, U-4H, U-6H, U-4HA, U-6HA, U-15HA, UA-32P, UA-33H, UA-53H, U-200PA, U-324A, UA-160TM, UA-290TM, UA-4200, UA-4400, UA-122P, UA-7100, and UA-W2A (manufactured by Shin-Nakamura Chemical Co., Ltd.).

Viscoat #195, #230, #260, #310HP, #335HP, #700HV, #540, #802, #295, #300, #360, and #230D; BAC-45, SPDBA-S30, and STAR-501 (manufactured by Osaka Organic Chemical Industry Ltd.).

LIGHT ESTER P-2M, EG, 2EG, 3EG, 4EG, 9EG, 14EG, 1.4BG, NP, 1.6HX, 1.9ND, G-101P, G-201P, BP-2EMK, and TMP; LIGHT ACRYLATE [registered trademark] 3EG-A, 4EG-A, 9EG-A, 14EG-A, PTMGA-250, NP-A, MPD-A, 1.6HX-A, 1.9ND-A, MOD-A, DCP-A, BP-4EAL, BP-4PA, HPP-A, G-201P, TMP-A, PE-3A, PE-4A, and DPE-6A; EPOXY ESTER 40EM, 70PA, 200PA, 80MFA, 3002M(N), 3002A(N), 3000MK, 3000A, and EX-0205; AH-600, AT-600, UA-306H, UA-306T, UA-306I, UA-510H, UF-8001G, and DAUA-167 (manufactured by Kyoeisha Chemical Co., Ltd.).

Art-Resin [registered trademark] UN-333, UN-350, UN-1255, UN-2600, UN-2700, UN-5200, UN-5500, UN-5590, UN-5507, UN-6060PTM, UN-6200, UN-6202, UN-6300, UN-6301, UN-7600, UN-7700, UN-9000H, UN-9000PEP, UN-9200A, UN-3320HA, UN-3200HB, UN-3320HC, UN-3320HS, UN-904, UN-906S, UN-901T, UN-905, UN-906, UN-952, HDP-4T, HMP-2, H-61, and HDP-M20 (manufactured by Negami Chemical Industrial Co., Ltd.).

SHIKOH [registered trademark] UV-1400B, UV-1700B, UV-2000B, UV-2010B, UV-2750B, UV-3000B, UV-3200B, UV-3210EA, UV-3300B, UV-3310B, UV-3500BA, UV-3520TL, UV-3610D80, UV-3630D80, UV-3640PE80, UV-3700B, UV-6100B, UV-6300B, UV-6640B, UV-7000, UV-7000B, UV-7461TE, UV-7510B, UV-7550B, UV-7600B, UV-7605B, UV-7610B, UV-7620EA, UV-7630B, UV-7640B, UV-7650B, UV-NS001, UV-NS034, UV-NS054, UV-NS063, and UV-NS077 (manufactured by The Nippon Synthetic Chemical Industry Co., Ltd.).

BEAMSET [registered trademark] 243NS, 255, 261, 271, 502H, 504H, 505A-6, 550B, 575, 577, 700, 710, 730, 750, AQ-17, EM-90, EM-92, 371, and 381 (manufactured by ARAKAWA CHEMICAL INDUSTRIES, LTD.).

FANCRYL [registered trademark] FA-124AS, FA-129AS, FA-222A, FA-240A, FA-P240A, FA-P270A, FA-321A, FA-324A, FA-PTG9A, FA-731A, FA-121M, FA-124M, FA-125M, FA-220M, FA-240M, FA-320M, FA-321M, FA-3218M, FA-PTG9M, and FA-137M (manufactured by Hitachi Chemical Company, Ltd.).

SR212, SR213, SR230, SR238F, SR259, SR268, SR272, SR306H, SR344, SR349, SR508, CD560, CD561, CD564, SR601, SR602, SR610, SR833S, SR9003, CD9043, SR9045, SR9209, SR205, SR206, SR209, SR210, SR214, SR231, SR239, SR248, SR252, SR297, SR348, SR480, CD540, CD541, CD542, SR603, SR644, SR9036, SR351S, SR368, SR415, SR444, SR454, SR492, SR499, CD501, SR502, SR9020, CD9021, SR9035, SR350, SR295, SR355, SR399, SR494, SR9041, SR9041, CN929, CN961E75, CN961H81, CN962, CN963, CN963A80, CN963B80, CN963E75, CN963E80, CN963J85, CN964, CN964E75, CN964A85, CN965, CN965A80, CN966A80, CN966H90, CN966J75, CN966R60, CN968, CN980, CN981, CN981A75, CN981B88, CN982, CN982A75, CN982B88, CN982E75, CN983, CN985B88, CN996, CN9001, CN9002, CN9788, CN9893, CN970A60, CN970E60, CN971, CN971A80, CN972, CN973A80, CN973H85, CN973J75, CN975, CN977C70, CN978, CN9782, CN9783, CN104, CN104A80, CN104B80, CN111, CN112C60, CN115, CN116, CN118, CN120, CN120A60, CN120A75, CN120B60, CN120B80, CN120060, CN120080, CN120D80, CN102E50, CN120M50, CN124, CNUVE151, CNUVE151/80, CN151, CN2203, CN2270, CN2271, CN2273, CN2274, CN307, CN371, CN550, CN551, SB401, SB402, SB404, SB500E50, SB500K60, SB510E35, SB520E35, and SB520M35 (manufactured by SARTOMER).

DPGDA, HODA, TPGDA, PEG400 DA-D, HPNDA, PETIA, PETRA, TMPTA, TMPEOTA, OTA480, DPHA, IRR214-K, IRR679, IRR742, IRR793, (ACA)Z200M, (ACA)Z230AA, (ACA)Z250, (ACA)Z251, (ACA)Z300, (ACA)Z320, (ACA)Z254F, EBERCRYL [registered trademark] 145, 150, 11, 135, 40, 140, 1142, 180, 204, 205, 210, 215, 220, 230, 244, 245, 264, 265 270, 280/151B, 284, 285, 294/25HD, 1259, 1290, 4820, 4858, 5129, 8210, 8254, 8301R, 8307, 8402, 8405, 8411, 8465, 8800, 8804, 8807, 9260, 9270, 8311, 8701, 9227EA, 436, 438, 446, 450, 524, 525, 770, 800, 810, 811, 812, 1830, 846, 851, 852, 853, 1870, 884, 885, 600, 605, 645, 648, 860, 1606, 3500, 3603, 3608, 3700, 3701, 3702, 3703, 3708, 6040, 8110, 271, 1258, 1291, 4100, 4200, 4500, 4680, 4220, 4265, 4491, 4513, 4587, 4666, 4683, 4738, 4740, 4250, and 4510; and KRM [registered trademark] 8200, 8200AE, 8296, 8452, 8904, 8667, 8912, 8981, 8762, 8713B, and 8528 (manufactured by DAICEL-ALLNEX LTD.).

BAEA-100, BAEM-100, BAEM-50, BEEM-50, BFEA-50, HPEA-100, CNEA-100, PNEM-50, RNEA-100, TEA-100, KUA-41, KUA-61, KUA-9N, KUA-10H, KUA-15N, KUA-C2I, KUA-PC2I, KUA-PEA2I, KUA-PEB2I, KUA-PEC2I, RP-274S, and RP-310 (manufactured by KSM CO., Ltd.).

These polyfunctional (meth)acrylate compounds may be used alone, or two or more thereof may be used in combination.

Examples of the hydroxymethyl group-substituted phenol compound include 2-hydroxymethyl-4,6-dimethylphenol, 1,3,5-trihydroxymethylbenzene, and 3,5-dihydroxymethyl-4-methoxytoluene[2,6-bis(hydroxymethyl)-p-cresol].

The compound having an alkoxyalkylated amino group is exemplified by a nitrogen-containing compound having a plurality of active methylol groups in one molecule thereof in which at least one hydrogen atom of hydroxy groups in the methylol groups is substituted by an alkyl group such as a methyl group or a butyl group, and examples of such nitrogen-containing compound include (poly)methylolated melamine, (poly)methylolated glycoluril, (poly)methylolated benzoguanamine, and (poly)methylolated urea.

The compound having an alkoxyalkylated amino group may be a mixture of a plurality of substituted compounds or may be a mixture including some oligomer components formed by self-condensation, and such a mixture may also be used. More specific examples of the mixture include CYMEL series products such as hexamethoxymethyl melamine (manufactured by Cytec Industries Inc., CYMEL [registered trademark] 303 and 303LF), tetrabutoxymethyl glycoluril (manufactured by Cytec Industries Inc., CYMEL [registered trademark] 1170), and tetramethoxymethyl benzoguanamine (manufactured by Cytec Industries Inc., CYMEL [registered trademark] 1123); POWDERLINK series products such as tetramethoxymethyl glycoluril (manufactured by Cytec Industries Inc., POWDERLINK [registered trademark] 1174); and NIKALAC series products such as methylated melamine resins (manufactured by SANWA Chemical Co., Ltd., NIKALAC [registered trademark] MW-30HM, MW-390, MW-100LM, and MX-750LM) and methylated urea resins (manufactured by SANWA Chemical Co., Ltd., NIKALAC [registered trademark] MX-270, MX-280, and MX-290). These cross-linking agents may be used alone, or two or more thereof may be used in combination.

The polyfunctional blocked isocyanate compound has, in one molecule, two or more isocyanate groups blocked by an appropriate protecting group, and is such that, when the compound is exposed to high temperatures at the time of thermosetting, the protecting group (the blocked portion) comes off due to thermal dissociation, and a crosslinking reaction is caused between a resultant isocyanate group and resin.

Such polyfunctional blocked isocyanate compound can be obtained by, for example, reacting a polyfunctional isocyanate compound having two or more isocyanate groups in one molecule thereof with an appropriate blocking agent.

Examples of the polyfunctional isocyanate compound include 1,4-tetramethylene diisocyanate, 1,5-pentamethylene diisocyanate, 1,6-hexamethylene diisocyanate, 2,2,4-trimethyl-1,6-hexamethylene diisocyanate, 1,3,6-hexamethylene triisocyanate, lysine diisocyanate, isophorone diisocyanate, 4,4'-dicyclohexylmethane diisocyanate, 1,3-bis(isocyanatemethyl)cyclohexane, 1,4-cyclohexyl diisocyanate, 2,6-bis(isocyanatemethyl)tetrahydrodicyclopentadiene, bis(isocyanatemethyl)dicyclopentadiene, bis(isocyanatemethyl)adamantane, 2,5-diisocyanatemethylnorbornene, norbornane diisocyanate, dicycloheptane triisocyanate, 4,4'-diphenylmethane diisocyanate, 2,4-tolylene diisocyanate, 2,6-tolylene diisocyanate, xylylene diisocyanate, tetramethylxylylene diisocyanate, 1,5-naphthalene diisocyanate, p-phenylene diisocyanate, 1,3-bis(isocyanatemethyl)benzene, dianisidine diisocyanate, 3,3'-dimethyldiphenyl-4,4'-diisocyanate, diphenyl ether diisocyanate, 2,6-bis(isocyanatemethyl)decahydronaphthalene, bis(diisocyanatetolyl)phenylmethane, 1,1'-methylenebis(3-methyl-4-isocyanatebenzene), 1,3-bis(1-isocyanate-1-methylethyl)benzene, 1,4-bis(1-isocyanate-1-methylethyl)benzene, 4,4'-biphenylene diisocyanate, 3,3'-dimethyl-4,4'-biphenylenediisocyanate, 3,3'-dimethoxy-4,4'-biphenylenediisocyanate, bis(isocyanatemethyl)thiophene, bis(isocyanatemethyl)tetrahydrothiophene, and modified compounds thereof (for example, an isocyanurate form, a biuret form, an ethylene glycol adduct form, a propylene glycol adduct form, a trimethylolpropane adduct form, an ethanol amine adduct form, a polyester polyol adduct form, a polyether polyol adduct form, a polyamide adduct form, and a polyamine adduct form).

Examples of the blocking agent include alcohols such as methanol, ethanol, isopropanol (2-propanol), n-butanol, heptanol, hexanol, 2-ethoxyhexanol, cyclohexanol, octanol, isononyl alcohol, stearyl alcohol, benzyl alcohol, 2-ethoxyethanol, methyl lactate, ethyl lactate, amyl lactate, ethylene glycol monomethyl ether, ethylene glycol monoethyl ether, ethylene glycol monobutyl ether, propylene glycol monomethyl ether, propylene glycol monoethyl ether, propylene glycol monopropyl ether, diethylene glycol monoethyl ether, diethylene glycol monobutyl ether), triethylene glycol monoethyl ether, N,N-dimethylaminoethanol, N,N-diethylaminoethanol, and N,N-dibutylaminoethanol; phenols, such as phenol, ethylphenol, propylphenol, butylphenol, octylphenol, nonylphenol, nitrophenol, chlorophenol, o-cresol, m-cresol, p-cresol, and xylenol; lactams, such as α-pyrrolidone, β-butyrolactam, β-propiolactam, γ-butyrolactam, δ-valerolactam, and ε-caprolactam; oximes, such as acetone oxime, methyl ethyl ketone oxime, methyl isobutyl ketone oxime, diethyl ketone oxime, cyclohexanone oxime, acetophenone oxime, and benzophenone oxime; pyrazoles, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; mercaptans, such as butyl mercaptan, hexyl mercaptan, dodecyl mercaptan, and benzenethiol; active methylene-based compounds, such as malonic diester, acetoacetic ester, malonic dinitrile, acetylacetone, methylenedisulfone, dibenzoylmethane, dipivaloylmethane, and acetonedicarboxylic acid diester; amines, such as dibutylamine, diisopropylamine, di-tert-butylamine, di(2-ethylhexyl)amine, dicyclohexylamine, benzylamine, diphenylamine, aniline, and carbazole; imidazoles, such as imidazole and 2-ethylimidazole; imines, such as methyleneimine, ethyleneimine, polyethyleneimine, and propyleneimine; acid amides, such as acetanilide, acrylamide, acetic acid amide, and dimer acid amide; acid imides, such as succinimid, maleimide, and phthalimide; and urea compounds, such as urea, thiourea, and ethylene urea. Furthermore, the blocking agent may be an internally blocked type resulting from uretdione bonding (dimerization of isocyanate groups).

Examples of commercially available products of the polyfunctional blocked isocyanate compound include the following products.

TAKENATE [registered trademark] B-815N, B-830, B-842N, B-846N, B-870, B-870N, B-874, B-874N, B-882, B-882N, B-5010, B-7005, B-7030, and B-7075 (manufactured by Mitsui Chemicals, Inc.).

DURANATE [registered trademark] ME20-B80S, MF-B60B, MF-B60X, MF-B90B, MF-K60B, MF-K60X, SBN-70D, 17B-60P, 17B-60PX, TPA-B80E, TPA-B80X, E402-B80B, E402-B80T, and K6000 (manufactured by Asahi Kasei Chemicals Corporation).

CORONATE [registered trademark] 2503, CORONATE 2507, 2512, 2513, 2515, 2520, 2554, BI-301, and AP-M; and Millionate MS-50 (manufactured by Tosoh Corporation).

BURNOCK [registered trademark] D-500, D-550, and DB-980K (manufactured by DIC Corporation).

Sumidur [registered trademark] BL-3175, BL-4165, BL-4265, BL-1100, and BL-1265; Desmodur [registered trademark] TPLS-2957, TPLS-2062, TPLS-2078, TPLS-2117, and BL-3475; and Desmotherm [registered trademark] 2170 and 2265 (manufactured by Sumika Bayer Urethane Co., Ltd.).

TRIXENE BI-7641, BI-7642, BI-7986, BI-7987, BI-7950, BI-7951, BI-7960, BI-7961, BI-7963, BI-7981, BI-7982, BI-7984, BI-7986, BI-7990, BI-7991, BI-7992, BI-7770, BI-7772, BI-7779, and DP9C/214 (manufactured by Baxenden Chemicals Ltd.).

VESTANAT [registered trademark] B1358A, B1358/100, and B1370; and VESTAGON [registered trademark] B1065, B1400, B1530, BF1320, and BF1540 (manufactured by Evonik Industries AG).

Examples of the polyfunctional blocked isocyanate compound include a homopolymer or a copolymer obtained by radical polymerization of (meth)acrylate having a blocked isocyanate group. The copolymer herein refers to a polymer obtained by polymerizing two or more kinds of monomers. The copolymer may be a copolymer obtained by polymerizing two or more (meth)acrylates each having a blocked isocyanate group, or may be a copolymer obtained by polymerizing a (meth)acrylate having a blocked isocyanate group and another (meth)acrylate. Examples of commercially available products of such (meth)acrylate having a blocked isocyanate group include Karenz [registered trademark] MOI-BM, AOI-BM, MOI-BP, AOI-BP, MOI-DEM, MOI-CP, MOI-MP, MOI-OEt, MOI-OBu, and MOI-OiPr (manufactured by Showa Denko K.K.).

These polyfunctional blocked isocyanate compounds may be used alone, or two or more thereof may be used in combination.

In the present invention, as a catalyst for promoting the cross-linking reaction, an acidic compound, such as p-toluenesulfonic acid, trifluoromethanesulfonic acid, pyridinium p-toluenesulfonic acid, salicylic acid, sulfosalicylic acid, citric acid, benzoic acid, hydroxybenzoic acid, or naphthalenecarboxylic acid; and/or a thermal acid generator, such as 2,4,4,6-tetrabromocyclohexadienone, benzoin tosylate, 2-nitrobenzyl tosylate, or other organic sulfonic acid alkyl esters may be contained. Such a catalyst is contained in an amount of 0.0001% by mass to 20% by mass, preferably 0.0005% by mass to 10% by mass with respect to the total solid content of the resin composition according to the present invention.

Hereinafter, the usage of the resin composition according to the present invention will be described.

Onto a substrate {such as a semiconductor substrate made of, for example, silicon covered with a silicon oxide film, a semiconductor substrate made of, for example, silicon covered with a silicon nitride film or a silicon oxynitride film, a silicon nitride substrate, a quartz substrate, a substrate made of glass (including non-alkali glass, low-alkali glass, and crystallized glass), and a glass substrate on which an ITO film is formed}, the resin composition according to the present invention is applied by an appropriate application means such as a spinner or a coater, and subsequently the resin composition is baked by a heating means such as a hot plate to form a cured film.

Conditions for the baking are appropriately selected from baking temperatures in a range of 80° C. to 270° C. and baking time in a range of 0.3 minutes to 60 minutes, and are preferably a baking temperature of 100° C. to 250° C. and a baking time of 0.5 minutes to 5 minutes.

The film thickness of the cured film formed from the resin composition according to the present invention is 0.005 μm to 4.0 μm, preferably 0.01 μm to 3.0 μm, more preferably 0.1 μm to 3.0 μm.

Subsequently, onto the cured film formed from the resin composition according to the present invention, a resist solution is applied, and exposed through a predetermined mask. The resultant is subjected to post-exposure baking (PEB) as necessary, and subjected to alkali development, rinsing, and drying, whereby a predetermined resist pattern is formed. For the exposure, for example, g-line, i-line, KrF excimer laser, or ArF excimer laser may be used.

Subsequently, the resist pattern is allowed to reflow by heat treatment, whereby a lens pattern is formed. Using this lens pattern as an etching mask, the cured film as an underlayer is etched back to transfer the lens pattern shape to the cured film, whereby a microlens is produced.

EXAMPLES

Hereinafter, the present invention will be described in further detail according to Examples and Comparative Examples, but, the present invention is not limited to these examples.

[Measurement of Weight-Average Molecular Weight of Copolymer Obtained in Synthesis Examples]

Apparatus: GPC system, manufactured by JASCO Corporation

Column: Shodex [registered trademark] KF-804L and -803L

Column Oven: 40° C.

Flow Rate: 1 mL/minute

Eluent: tetrahydrofuran

[Synthesis of Polymer]

Synthesis Example 1

4.15 g of 1,4-benzene dithiol, 15.0 g of bisphenol fluorene diglycidyl ether, and 0.649 g of ethyl triphenyl phosphonium bromide were dissolved in 59.4 g of cyclohexanone, and subsequently, the resultant solution was allowed to react at room temperature for 18 hours, so that a solution containing a copolymer having a structural unit of Formula (4) (solid-content concentration: 25% by mass) was obtained. The obtained copolymer had a weight-average molecular weight Mw of 14,800 (in terms of polystyrene).

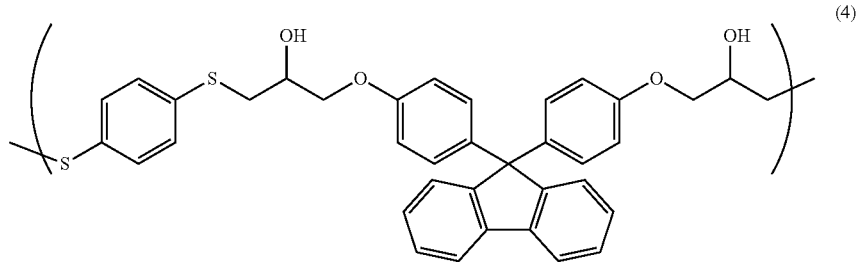

(4)

Synthesis Example 2

3.89 g of 4,4'-thiobisbenzenethiol, 8.00 g of bisphenol fluorene diglycidyl ether, and 0.346 g of ethyl triphenyl phosphonium bromide were dissolved in 28.6 g of cyclohexanone, and subsequently, the resultant solution was allowed to react at room temperature for 18 hours, so that a solution containing a copolymer having a structural unit of Formula (5) (solid-content concentration: 30% by mass) was obtained. The obtained copolymer had a weight-average molecular weight Mw of 6,800 (in terms of polystyrene).

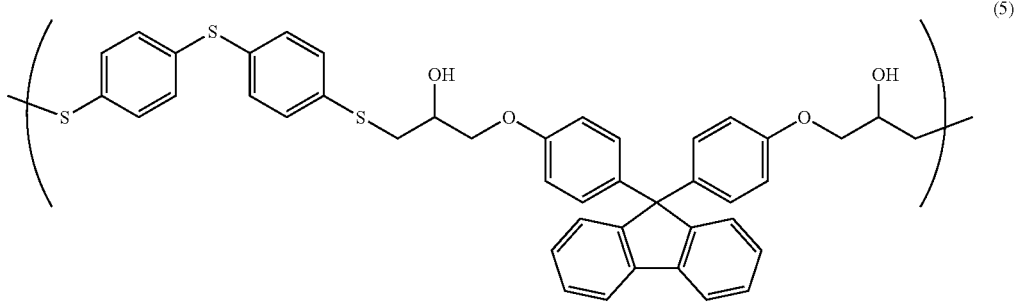

(5)

Synthesis Example 3

5.24 g of 6-anilino-1,3,5-triazine-2,4-dithiol, 10.0 g of bisphenol fluorene diglycidyl ether, and 0.247 g of ethyl triphenyl phosphonium bromide were dissolved in 61.9 g of cyclohexanone, and subsequently, the resultant solution was allowed to react at room temperature for 18 hours, and subjected to reprecipitation with methanol, so that a copolymer having a structural unit of Formula (6) was obtained. The obtained copolymer had a weight-average molecular weight Mw of 14,100 (in terms of polystyrene).

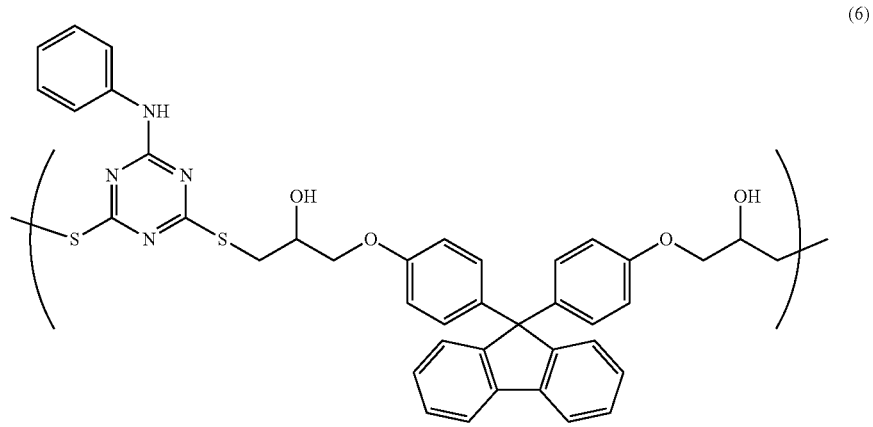

(6)

Synthesis Example 4

4.38 g of bismuthiol, 15.0 g of bisphenol fluorene diglycidyl ether, and 0.649 g of ethyl triphenyl phosphonium bromide were dissolved in 60.1 g of cyclohexanone, and subsequently, the resultant solution was allowed to react at room temperature for 18 hours, so that a solution containing a copolymer having a structural unit of Formula (7) (solid-content concentration: 25% by mass) was obtained. The obtained copolymer had a weight-average molecular weight Mw of 24,200 (in terms of polystyrene).

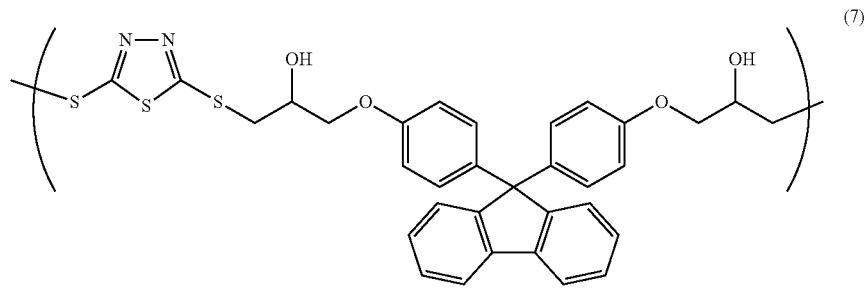

(7)

Synthesis Example 5

4.7 g of 6-(diallylamino)-1,3,5-triazine-2,4-dithiol, 10.0 g of bisphenol fluorene diglycidyl ether, and 0.400 g of ethyl triphenyl phosphonium bromide were dissolved in 60.5 g of cyclohexanone, and subsequently, the resultant solution was allowed to react at room temperature for 18 hours, so that a solution containing a copolymer having a structural unit of Formula (8) (solid-content concentration: 20% by mass) was obtained. The obtained copolymer had a weight-average molecular weight Mw of 68,000 (in terms of polystyrene).

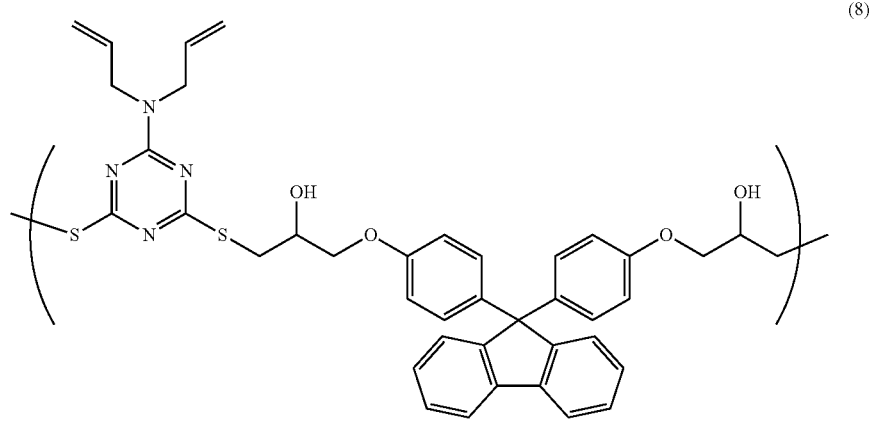

(8)

Synthesis Example 6

3.60 g of 1,4-benzene dithiol, 15.0 g of bisnaphthol fluorene diglycidyl ether, and 0.564 g of ethyl triphenyl phosphonium bromide were dissolved in 57.5 g of cyclohexanone, and subsequently, the resultant solution was allowed to react at room temperature for 18 hours, and subjected to reprecipitation with methanol, so that a copolymer having a structural unit of Formula (9) was obtained. The obtained copolymer had a weight-average molecular weight Mw of 26,600 (in terms of polystyrene).

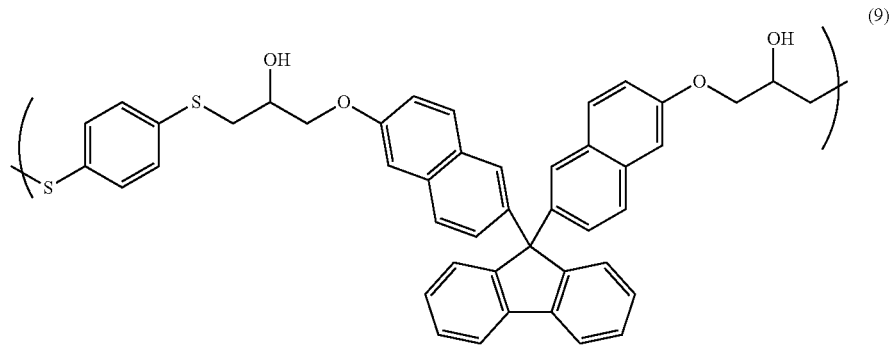

(9)

Synthesis Example 7

1.69 g of 4,4'-thiobisbenzenethiol, 4.00 g of bisnaphthol fluorene diglycidyl ether, and 0.150 g of ethyl triphenyl phosphonium bromide were dissolved in 17.5 g of cyclohexanone, and subsequently, the resultant solution was allowed to react at room temperature for 18 hours, so that a solution containing a copolymer having a structural unit of Formula (10) (solid-content concentration: 25% by mass) was obtained. The obtained copolymer had a weight-average molecular weight Mw of 12,600 (in terms of polystyrene).

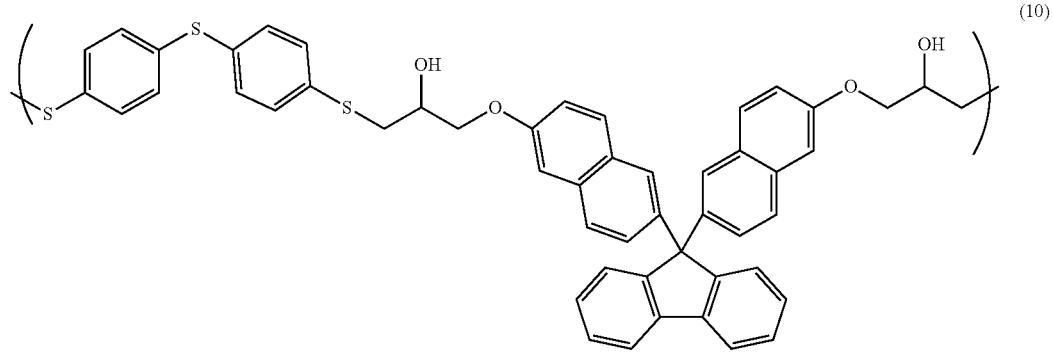

(10)

Synthesis Example 8

2.79 g of 6-anilino-1,3,5-triazine-2,4-dithiol, 7.00 g of bisnaphthol fluorene diglycidyl ether, and 0.263 g of ethyl triphenyl phosphonium bromide were dissolved in 23.5 g of cyclohexanone, and subsequently, the resultant solution was allowed to react at room temperature for 18 hours, and subjected to reprecipitation with methanol, so that a copolymer having a structural unit of Formula (11) was obtained. The obtained copolymer had a weight-average molecular weight Mw of 3,800 (in terms of polystyrene).

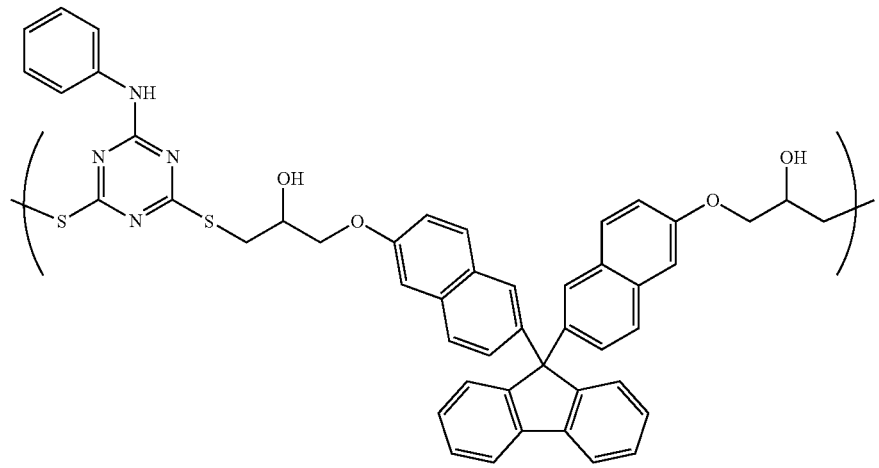

(11)

Synthesis Example 9

3.80 g of bismuthiol, 15.0 g of bisnaphthol fluorene diglycidyl ether, and 0.564 g of ethyl triphenyl phosphonium bromide were dissolved in 58.1 g of cyclohexanone, and subsequently, the resultant solution was allowed to react at room temperature for 18 hours, and subjected to reprecipitation with methanol, so that a copolymer having a structural unit of Formula (12) was obtained. The obtained copolymer had a weight-average molecular weight Mw of 22,900 (in terms of polystyrene).

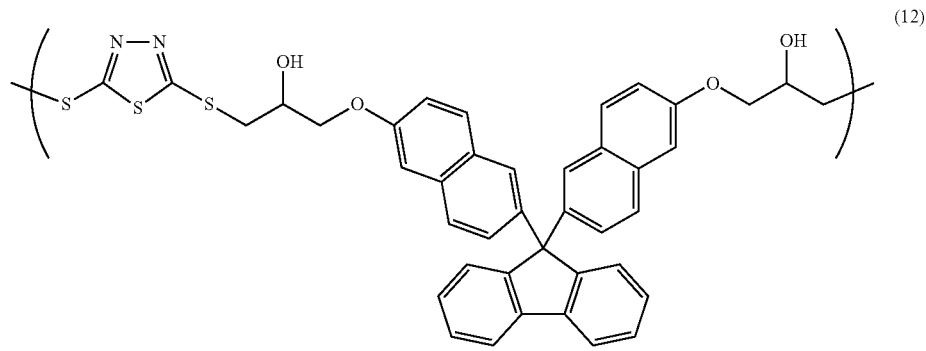

(12)

Synthesis Example 10

3.8 g of 6-(diallylamino)-1,3,5-triazine-2,4-dithiol, 10.0 g of bisnaphthol fluorene diglycidyl ether, and 0.300 g of ethyl triphenyl phosphonium bromide were dissolved in 57.0 g of cyclohexanone, and subsequently, the resultant solution was allowed to react at room temperature for 18 hours, so that a solution containing a copolymer having a structural unit of Formula (13) (solid-content concentration: 20% by mass) was obtained. The obtained copolymer had a weight-average molecular weight Mw of 99,000 (in terms of polystyrene).

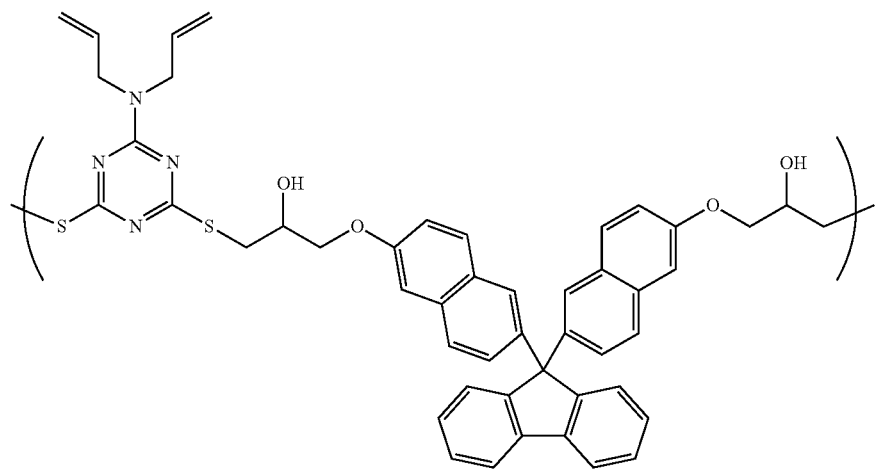

(13)

Synthesis Example 11

4.38 g of 2,3-dihydroxybutanedioic acid, 15.0 g of bisphenol fluorene diglycidyl ether, and 1.30 g of ethyl triphenyl phosphonium bromide were dissolved in 48.2 g of cyclohexanone, and subsequently, the resultant solution was allowed to react under reflux for 18 hours, so that a solution containing a copolymer having a structural unit of Formula (14) (solid-content concentration: 30% by mass) was obtained. The obtained copolymer had a weight-average molecular weight Mw of 3,700 (in terms of polystyrene).

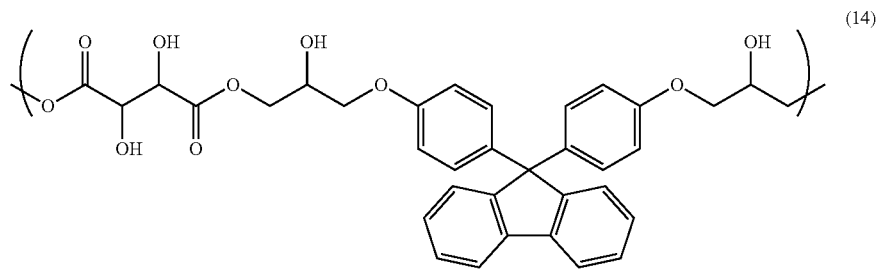

(14)

Synthesis Example 12

3.80 g of 2,3-dihydroxybutanedioic acid, 15.0 g of bis-naphthol fluorene diglycidyl ether, and 1.13 g of ethyl triphenyl phosphonium bromide were dissolved in 49.5 g of cyclohexanone, and subsequently, the resultant solution was allowed to react under reflux for 18 hours, so that a solution containing a copolymer having a structural unit of Formula (15) (solid-content concentration: 30% by mass) was obtained. The obtained copolymer had a weight-average molecular weight Mw of 5,800 (in terms of polystyrene).

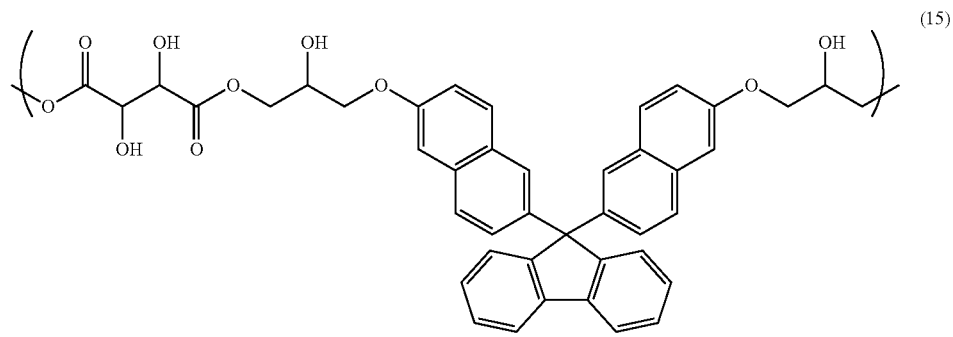

(15)

[Synthesis of Cross-linking Agent]

Synthesis Example 13

40.0 g of 2-[(3,5-dimethylpyrazolyl)carbonylamino]ethyl methacrylate and 2.61 g of 2,2'-azobisisobutyronitrile were dissolved in 79.1 g of propylene glycol monomethyl ether. Subsequently, the resultant solution was added dropwise over 3 hours into a flask in which 48.7 g of propylene glycol monomethyl ether was kept at 80° C. After completion of the dropwise addition, the resultant mixture was allowed to react for 18 hours to obtain a solution containing a homopolymer having a structural unit of Formula (16) (solid-content concentration: 24.3% by mass). The obtained homopolymer had a weight-average molecular weight Mw of 14,500 (in terms of polystyrene).

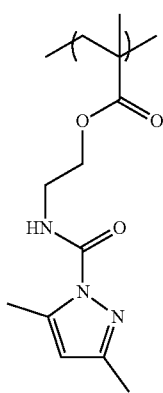

(16)

[Preparation of Resin Composition]

Example 1

15.0 g of the copolymer solution obtained in Synthesis Example 1, 0.00413 g of DFX-18 (manufactured by NEOS Co., Ltd.) as a surfactant, and 0.154 g of the homopolymer solution obtained in Synthesis Example 13 as a cross-linking agent were dissolved in 24.3 g of cyclohexanone to prepare a solution. Subsequently, the resultant solution was filtered using a polyethylene microfilter having a pore size of 0.45 µm to prepare a resin composition.

Example 2

15.0 g of the copolymer solution obtained in Synthesis Example 2, 0.00473 g of DFX-18 (manufactured by NEOS Co., Ltd.) as a surfactant, and 0.923 g of the homopolymer solution obtained in Synthesis Example 13 as a cross-linking agent were dissolved in 30.9 g of cyclohexanone to prepare a solution. Subsequently, the resultant solution was filtered using a polyethylene microfilter having a pore size of 0.45 µm to prepare a resin composition.

Example 3

15.0 g of the copolymer solution obtained in Synthesis Example 3, 0.00180 g of DFX-18 (manufactured by NEOS Co., Ltd.) as a surfactant, 0.300 g of CYMEL [registered trademark] 303LF (manufactured by Cytec Industries Inc.) as a cross-linking agent, and 0.0150 g of p-toluenesulfonic acid monohydrate as an acid catalyst were dissolved in 16.0 g of cyclohexanone to prepare a solution. Subsequently, the resultant solution was filtered using a polyethylene microfilter having a pore size of 0.45 µm to prepare a resin composition.

Example 4

15.0 g of the copolymer solution obtained in Synthesis Example 4, 0.00450 g of DFX-18 (manufactured by NEOS Co., Ltd.) as a surfactant, 0.750 g of CYMEL 303LF (manufactured by Cytec Industries Inc.) as a cross-linking agent, and 0.0375 g of p-toluenesulfonic acid monohydrate as an acid catalyst were dissolved in 28.8 g of cyclohexanone to prepare a solution. Subsequently, the resultant solution was filtered using a polyethylene microfilter having a pore size of 0.45 µm to prepare a resin composition.

Example 5

25.0 g of the copolymer solution obtained in Synthesis Example 5, 0.020 g of DFX-18 (manufactured by NEOS Co., Ltd.) as a surfactant, 1.00 g of CYMEL 303LF (manufactured by Cytec Industries Inc.) as a cross-linking agent, and 0.100 g of p-toluenesulfonic acid monohydrate as an acid catalyst were dissolved in 36.0 g of cyclohexanone and 14.1 g of propylene glycol monomethyl ether to prepare a solution. Subsequently, the resultant solution was filtered using a polyethylene microfilter having a pore size of 0.45 µm to prepare a resin composition.

Example 6

15.0 g of the copolymer obtained in Synthesis Example 6, 0.0180 g of DFX-18 (manufactured by NEOS Co., Ltd.) as a surfactant, 3.00 g of CYMEL 303LF (manufactured by Cytec Industries Inc.) as a cross-linking agent, and 0.0150 g of p-toluenesulfonic acid monohydrate as an acid catalyst were dissolved in 16.0 g of cyclohexanone to prepare a solution. Subsequently, the resultant solution was filtered using a polyethylene microfilter having a pore size of 0.45 µm to prepare a resin composition.

Example 7

15.0 g of the copolymer solution obtained in Synthesis Example 7, 0.00450 g of DFX-18 (manufactured by NEOS Co., Ltd.) as a surfactant, 0.750 g of CYMEL 303LF (manufactured by Cytec Industries Inc.) as a cross-linking agent, and 0.0375 g of p-toluenesulfonic acid monohydrate as an acid catalyst were dissolved in 28.8 g of cyclohexanone to prepare a solution. Subsequently, the resultant solution was filtered using a polyethylene microfilter having a pore size of 0.45 µm to prepare a resin composition.

Example 8

15.0 g of the copolymer obtained in Synthesis Example 8, 0.0180 g of DFX-18 (manufactured by NEOS Co., Ltd.) as a surfactant, 3.00 g of CYMEL 303LF (manufactured by Cytec Industries Inc.) as a cross-linking agent, and 0.150 g of p-toluenesulfonic acid monohydrate as an acid catalyst were dissolved in 16.0 g of cyclohexanone to prepare a solution. Subsequently, the resultant solution was filtered using a polyethylene microfilter having a pore size of 0.45 µm to prepare a resin composition.

Example 9

15.0 g of the copolymer obtained in Synthesis Example 9, 0.0180 g of DFX-18 (manufactured by NEOS Co., Ltd.) as a surfactant, 3.00 g of CYMEL 303LF (manufactured by Cytec Industries Inc.) as a cross-linking agent, and 0.150 g of p-toluenesulfonic acid monohydrate as an acid catalyst were dissolved in 16.0 g of cyclohexanone to prepare a solution. Subsequently, the resultant solution was filtered using a polyethylene microfilter having a pore size of 0.45 µm to prepare a resin composition.

Example 10

25.0 g of the copolymer solution obtained in Synthesis Example 10, 0.0200 g of DFX-18 (manufactured by NEOS Co., Ltd.) as a surfactant, 1.0 g of CYMEL 303LF (manufactured by Cytec Industries Inc.) as a cross-linking agent, and 0.100 g of p-toluenesulfonic acid monohydrate as an acid catalyst were dissolved in 36.0 g of cyclohexanone and 14.1 g of propylene glycol monomethyl ether to prepare a solution. Subsequently, the resultant solution was filtered using a polyethylene microfilter having a pore size of 0.45 µm to prepare a resin composition.

Comparative Example 1

11.0 g of the copolymer solution obtained in Synthesis Example 11, 0.00396 g of DFX-18 (manufactured by NEOS Co., Ltd.) as a surfactant, 0.660 g of CYMEL 303LF (manufactured by Cytec Industries Inc.) as a cross-linking agent, and 0.0330 g of p-toluenesulfonic acid monohydrate as an acid catalyst were dissolved in 27.6 g of cyclohexanone to prepare a solution. Subsequently, the resultant solution was filtered using a polyethylene microfilter having a pore size of 0.45 µm to prepare a resin composition.

Comparative Example 2

11.0 g of the copolymer solution obtained in Synthesis Example 12, 0.00396 g of DFX-18 (manufactured by NEOS Co., Ltd.) as a surfactant, 0.660 g of CYMEL 303LF (manufactured by Cytec Industries Inc.) as a cross-linking agent, and 0.0330 g of p-toluenesulfonic acid monohydrate as an acid catalyst were dissolved in 27.6 g of cyclohexanone to prepare a solution. Subsequently, the resultant solution was filtered using a polyethylene microfilter having a pore size of 0.45 µm to prepare a resin composition.

[Measurement of Refractive Index]

Each of the resin compositions prepared in Examples 1 to 10 and Comparative Examples 1 and 2 was applied onto a silicon wafer by using a spin coater, and the coated wafer was baked on a hot plate at 100° C. for one minute and further at 230° C. for 5 minutes to form a cured film having a film thickness of 0.5 The refractive index of these resultant cured films at a wavelength of 550 nm was measured using a high speed spectroscopic ellipsometer, M-2000 (manufactured by J.A. Woollam JAPAN Co., Inc.). Table 1 lists evaluation results.

[Measurement of Transmittance]

Each of the resin compositions prepared in Examples 1 to 10 and Comparative Examples 1 and 2 was applied onto a quartz substrate by using a spin coater, and the coated wafer was baked on a hot plate at 100° C. for one minute and further at 230° C. for 5 minutes to form a cured film having a film thickness of 0.5 The transmittance of these resultant cured films at a wavelength of 400 nm was measured using an ultraviolet-visible spectrophotometer, UV-2550 (manufactured by Shimadzu Corporation). Each of these cured films was further heated at 260° C. for 5 minutes, and subsequently the transmittance thereof at a wavelength of 400 nm was measured. Table 1 lists evaluation results.

[Solvent Resistance Test]

Each of the resin compositions prepared in Examples 1 to 10 and Comparative Examples 1 and 2 was applied onto a silicon wafer by using a spin coater, and the coated wafer was baked on a hot plate at 100° C. for one minute and further at 230° C. for 5 minutes to form a cured film having a film thickness of 0.5 Each of these resultant cured films was tested by being immersed in each of propylene glycol monomethylether, propylene glycol monomethylether acetate, ethyl lactate, and cyclohexanone under a temperature condition of 23° C. for 5 minutes. The amount of change in the film thickness of each film before and after the immersion was measured, and the results revealed that the amount of change in the film thickness thereof was less than 5% in all the cases of the immersion in the above-mentioned solvents.

[Measurement of Dry Etching Rate]

An etcher and an etching gas that were used for the measurement of dry etching rate are as follows.

Etcher: RIE-10NR (manufactured by Samco Inc.)
Etching gas: $CF_4$

Each of the resin compositions prepared in Examples 1 to 10 and Comparative Examples 1 and 2 was applied onto a silicon wafer by using a spin coater, and the coated wafer was baked on a hot plate at 100° C. for one minute and further at 230° C. for 5 minutes to form a cured film having a film thickness of 0.5 µm. The dry etching rate of each of these resultant cured films was measured using the above-mentioned etcher and etching gas. Likewise, a resist solution (THMR-iP1800 (manufactured by Tokyo Ohka Kogyo Co., Ltd.)) was applied onto a silicon wafer by using a spin coater, and the coated wafer was baked on a hot plate at 90° C. for 1.5 minutes to form a resist film having a film thickness of 0.5 µm, and the dry etching rate of the resist film was measured. Subsequently, the ratio of the dry etching rate of the cured film obtained from each of the resin compositions prepared in Example 1 to Example 10 and Comparative Examples 1 and 2 with respect to the resist film was calculated. Table 1 lists evaluation results.

TABLE 1

| | Film Thickness (µm) | Refractive Index (wavelength: 550 nm) | Transmittance/% (wavelength: 400 nm) | | Dry Etching Rate Ratio (with respect to resist) |
|---|---|---|---|---|---|
| | | | 230° C. | 260° C. | |
| Example 1 | 0.5 | 1.69 | 95 | 95 | 1.0 |
| Example 2 | 0.5 | 1.71 | 99 | 99 | 1.0 |
| Example 3 | 0.5 | 1.69 | 96 | 92 | 1.0 |
| Example 4 | 0.5 | 1.69 | 94 | 91 | 1.1 |
| Example 5 | 0.5 | 1.68 | 98 | 97 | 1.0 |
| Example 6 | 0.5 | 1.73 | 90 | 90 | 0.9 |
| Example 7 | 0.5 | 1.73 | 90 | 90 | 0.9 |
| Example 8 | 0.5 | 1.72 | 99 | 98 | 1.0 |
| Example 9 | 0.5 | 1.72 | 93 | 91 | 1.2 |
| Example 10 | 0.5 | 1.71 | 97 | 96 | 1.0 |
| Comparative Example 1 | 0.5 | 1.64 | 92 | 92 | 1.0 |
| Comparative Example 2 | 0.5 | 1.66 | 94 | 89 | 0.9 |

The results in Table 1 reveal that each of the cured films formed from the resin compositions according to the present invention had a high refractive index of 1.68 or more, and, in particular, each of the cured films formed from the resin compositions prepared in Example 2 and Examples 6 to 10 had a higher refractive index of 1.70 or more, and also had high transparency as well as such high heat resistance that the film exhibited a high transmittance of 90% or more even after heated at 260° C. In the etch back method, for the accurate transfer of a lens pattern shape to a cured film as an underlayer, the dry etching rate X of the resist and the dry etching rate Y of the cured film are required to be substantially equal (X:Y=1:0.8 to 1:1.2). The resin composition according to the present invention satisfied this requirement. In contrast, the cured films formed from the resin compositions having no sulfur atom, which were prepared in Comparative Examples 1 and 2, had a refractive index of less than 1.68, which was lower than the refractive index of the cured films formed from the resin compositions prepared in Examples 1 to 10.

INDUSTRIAL APPLICABILITY

A cured film obtained from a resin composition containing the polymer according to the present invention is capable of satisfying a high refractive index, high transparency, and high heat resistance, and accordingly, can be suitably used as a microlens of a solid-state imaging element.

The invention claimed is:

1. A resin composition, comprising:
a polymer having a structural unit of Formula (1):

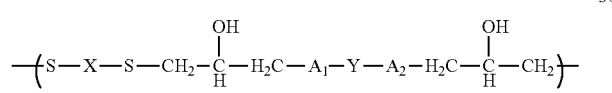
(1)

wherein $A_1$ and $A_2$ are each independently an —O— group or a —C(=O)O— group; X is a divalent organic group having at least one aromatic ring or heterocyclic ring, wherein, when the X has two or more aromatic rings or heterocyclic rings, the rings are optionally bonded to each other via a single bond, are optionally bonded to each other via a heteroatom, or optionally form a condensed ring; and Y is a divalent organic represented by Formula (g)

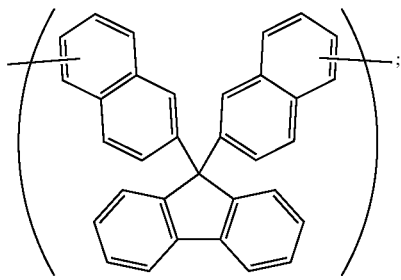
(g)

a cross-linking agent; and
a solvent.

2. The resin composition, according to claim 1, wherein raw material monomers of the polymer are a compound of Formula (2) and a compound of Formula (3):

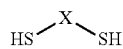
(2)

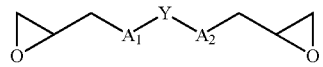
(3)

wherein $A_1$, $A_2$, X, and Y are defined as same as the definition in the Formula (1).

3. The resin composition according to claim 1, wherein the divalent organic group of the X is represented by Formula (a), Formula (b), Formula (c), Formula (d), or Formula (e):

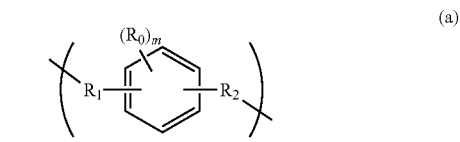
(a)

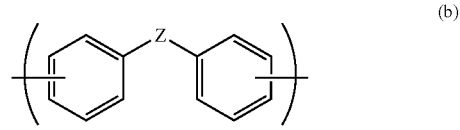
(b)

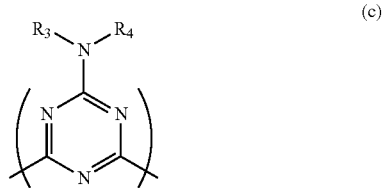
(c)

(d)

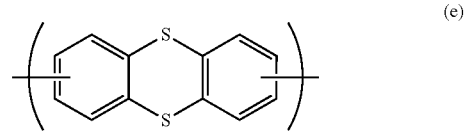
(e)

wherein $R_0$ is a methyl group; m is an integer of 0 to 2; $R_1$ and $R_2$ are each independently a single bond or a methylene group; Z is a single bond or a —S— group; $R_3$ is a hydrogen atom, a $C_{1-10}$ alkyl group optionally having a branched structure, an aryl group, a $C_2$ or $C_3$ alkenyl group, or a $C_2$ or $C_3$ alkynyl group; and $R_4$ is a $C_{1-10}$ alkyl group optionally having a branched structure, an aryl group, a $C_2$ or $C_3$ alkenyl group, or a $C_2$ or $C_3$ alkynyl group.

4. The resin composition according to claim 1, wherein the polymer has a weight-average molecular weight of 1,000 to 150,000.

5. A method for synthesizing the polymer as claimed in claim 1, the method comprising polymerizing a compound of Formula (2) and a compound of Formula (3) at a molar ratio of 3:5 to 5:3 under a temperature of 23° C. to 200° C.

$$HS-X-SH \quad (2)$$

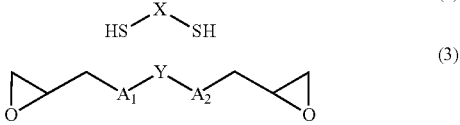
(3)

wherein $A_1$, $A_2$, X, and Y are defined as same as the definition in the Formula (1).

6. The resin composition according to claim 1, the resin composition being a composition for microlenses.

7. A method for forming a cured film, the method comprising:
   applying the resin composition as claimed in claim 1 onto a substrate; and
   subsequently baking the resin composition by using a heating means.

* * * * *